(12) United States Patent
Slavens et al.

(10) Patent No.: US 9,714,580 B2
(45) Date of Patent: Jul. 25, 2017

(54) TROUGH SEAL FOR GAS TURBINE ENGINE

(71) Applicant: UNITED TECHNOLOGIES CORPORATION, Hartford, CT (US)

(72) Inventors: Thomas N. Slavens, Vernon, CT (US); Sasha M. Moore, East Hartford, CT (US); Nicholas M. LoRicco, Coventry, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/907,461

(22) PCT Filed: Jul. 24, 2014

(86) PCT No.: PCT/US2014/047997
§ 371 (c)(1),
(2) Date: Jan. 25, 2016

(87) PCT Pub. No.: WO2015/013503
PCT Pub. Date: Jan. 29, 2015

(65) Prior Publication Data
US 2016/0177767 A1    Jun. 23, 2016

Related U.S. Application Data

(60) Provisional application No. 61/857,782, filed on Jul. 24, 2013.

(51) Int. Cl.
*F01D 11/00* (2006.01)
*F04D 29/08* (2006.01)
(Continued)

(52) U.S. Cl.
CPC .......... *F01D 11/008* (2013.01); *F01D 11/006* (2013.01); *F04D 29/083* (2013.01);
(Continued)

(58) Field of Classification Search
CPC .... F01D 11/003; F01D 11/005; F01D 11/008; F16J 15/06; F16J 15/0887; F04D 29/083;
(Continued)

(56) References Cited

U.S. PATENT DOCUMENTS 3,752,598 A * 8/1973 Bowers ................ F01D 5/3007
415/115
4,013,373 A * 3/1977 Lamprecht .............. F16C 33/60
220/320

(Continued)

FOREIGN PATENT DOCUMENTS

EP         896128 A2     5/2004

OTHER PUBLICATIONS

The International Preliminary Report on Patentability for PCT Application No. PCT/US2014/047997, mailed on Feb. 4, 2016.

*Primary Examiner* — Eugene G Byrd
(74) *Attorney, Agent, or Firm* — Carlson, Gaskey & Olds, P.C.

(57) ABSTRACT

This disclosure relates to a gas turbine engine including a first engine component and a second engine component. The first engine component has a mate face adjacent a mate face of the second engine component. The engine further includes a seal provided between the mate face of the first engine component and the mate face of the second engine component. The seal includes least one trough.

18 Claims, 4 Drawing Sheets

(51) Int. Cl.
  *F04D 29/54* (2006.01)
  *F16J 15/06* (2006.01)
  *F16J 15/08* (2006.01)

(52) U.S. Cl.
  CPC ............ *F04D 29/542* (2013.01); *F16J 15/06* (2013.01); *F16J 15/062* (2013.01); *F16J 15/0887* (2013.01); *F05D 2220/32* (2013.01); *F05D 2240/55* (2013.01); *F05D 2250/75* (2013.01)

(58) Field of Classification Search
  CPC ............... F04D 29/542; F05D 2220/32; F05D 2220/11; F05D 2220/55; F05D 2250/70
  See application file for complete search history.

(56) References Cited

U.S. PATENT DOCUMENTS

| | | | |
|---|---|---|---|
| 4,184,689 A | 1/1980 | Brodell et al. | |
| 4,311,432 A * | 1/1982 | Kildea | F01D 11/08 415/134 |
| 4,318,668 A | 3/1982 | Chaplin et al. | |
| 4,537,024 A | 8/1985 | Grosjean | |
| 5,058,906 A * | 10/1991 | Adamek | F16L 17/08 277/614 |
| 5,158,430 A * | 10/1992 | Dixon | F01D 11/005 415/134 |
| 5,240,263 A | 8/1993 | Nicholson | |
| 5,357,744 A | 10/1994 | Czachor | |
| 5,655,876 A | 8/1997 | Rock et al. | |
| 5,738,490 A | 4/1998 | Pizzi | |
| 5,762,472 A | 6/1998 | Pizzi et al. | |
| 5,868,398 A * | 2/1999 | Maier | F01D 11/005 277/643 |
| 5,934,687 A | 8/1999 | Bagepalli et al. | |
| 5,975,844 A | 11/1999 | Milazar et al. | |
| 6,199,871 B1 * | 3/2001 | Lampes | F01D 11/005 277/614 |
| 6,354,795 B1 | 3/2002 | White et al. | |
| 6,413,042 B2 | 7/2002 | Correia | |
| 6,431,825 B1 | 8/2002 | McLean | |
| 6,568,692 B2 | 5/2003 | Kolodziej et al. | |
| 6,722,850 B2 | 4/2004 | Burdgick | |
| 6,733,234 B2 * | 5/2004 | Paprotna | F01D 11/005 277/637 |
| 6,832,896 B1 * | 12/2004 | Goga | F01D 5/3007 416/191 |
| 6,843,479 B2 | 1/2005 | Burdgick | |
| 6,883,807 B2 | 4/2005 | Smed | |
| 6,971,844 B2 | 12/2005 | Burdgick | |
| 7,021,061 B2 * | 4/2006 | Tiemann | F23M 5/00 110/336 |
| 7,063,503 B2 * | 6/2006 | Meisels | F01D 25/24 415/116 |
| 7,261,514 B2 | 8/2007 | London et al. | |
| 7,360,769 B2 * | 4/2008 | Bennett | F01D 11/005 277/641 |
| 7,624,991 B2 * | 12/2009 | Putch | F16L 17/06 277/606 |
| 7,665,962 B1 * | 2/2010 | Liang | F01D 11/24 415/115 |
| 7,690,885 B2 * | 4/2010 | Lee | F01D 11/08 415/1 |
| 7,901,186 B2 | 3/2011 | Cornett et al. | |
| 8,016,297 B2 | 9/2011 | Heinemann et al. | |
| 9,052,016 B2 * | 6/2015 | Twelves, Jr. | F02K 1/805 |
| 9,175,573 B2 * | 11/2015 | Cairo | F01D 5/3092 |
| 2004/0120808 A1 | 6/2004 | Alford et al. | |
| 2004/0173975 A1 * | 9/2004 | Hirst | F01D 11/005 277/603 |
| 2007/0212214 A1 * | 9/2007 | Paauwe | F01D 9/041 415/170.1 |
| 2009/0072497 A1 * | 3/2009 | Kunitake | F01D 9/023 277/641 |
| 2012/0195743 A1 | 8/2012 | Walunj et al. | |
| 2013/0028713 A1 * | 1/2013 | Giri | F16J 15/0887 415/135 |
| 2014/0062032 A1 * | 3/2014 | Wolfe | F16J 15/128 277/590 |
| 2014/0225334 A1 * | 8/2014 | Kugimiya | F01D 11/005 277/637 |

* cited by examiner

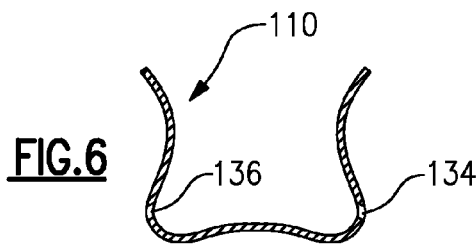
FIG. 6
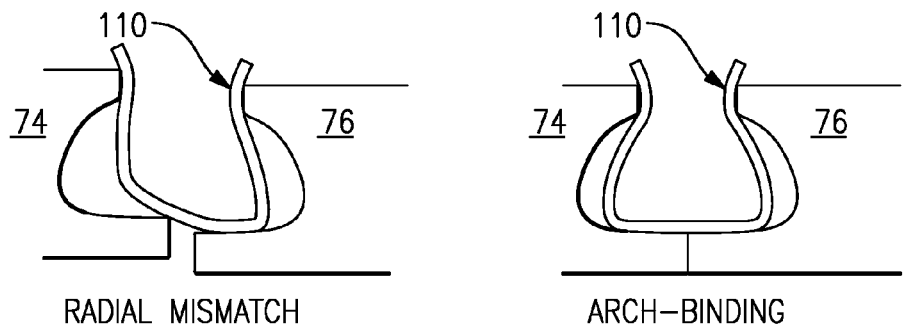
RADIAL MISMATCH
FIG. 7A
ARCH-BINDING
FIG. 7B
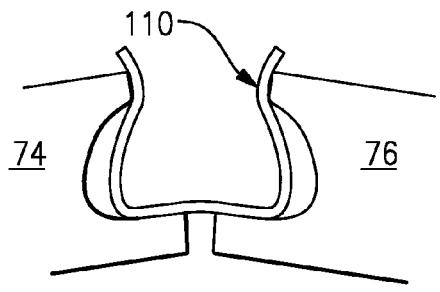
ARCH-FLATTENING
FIG. 7C
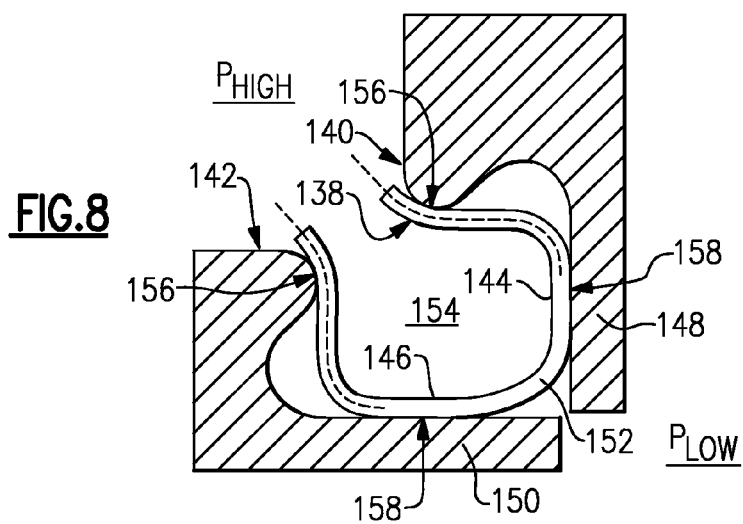
FIG. 8

TROUGH SEAL FOR GAS TURBINE ENGINE

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. These blades and vanes are typically cooled with a flow of cooling fluid. In order to separate the hot combustion gases from the flow of cooling fluid, seals are provided at various points in the engine. In one known sealing arrangement, the mating faces of adjacent engine components include a slot and a featherseal.

SUMMARY

One exemplary embodiment of this disclosure relates to a gas turbine engine including a first engine component and a second engine component. The first engine component has a mate face adjacent a mate face of the second engine component. The engine further includes a seal between the mate face of the first engine component and the mate face of the second engine component. The seal includes at least one trough.

In a further embodiment of any of the above, the seal includes two points of contact with each mate face.

In a further embodiment of any of the above, the seal includes a linear portion, and a first wall and a second wall protruding away from the linear portion to provide the at least one trough.

In a further embodiment of any of the above, each of the first wall and the second wall provide an overlap portion at an end distal from the linear portion, the overlap portions including a first point of contact between the seal and each of the mate faces.

In a further embodiment of any of the above, the linear portion includes a second point of contact between the seal and a substantially horizontal portion of each of the mate faces.

In a further embodiment of any of the above, the overlap portions have an inflection away from a centerline of the seal.

In a further embodiment of any of the above, each of the first wall and the second wall have an inflection toward the centerline of the seal proximate the linear portion.

In a further embodiment of any of the above, each mate face includes a substantially concave portion adjacent the substantially horizontal portions of the mate face.

In a further embodiment of any of the above, the overlap portions radially overlap a high pressure surface of the first and second engine components.

In a further embodiment of any of the above, each mate face includes a substantially convex surface adjacent the high pressure surface, the overlap portions being in contact with the convex surfaces.

In a further embodiment of any of the above, the first component and the second component bound a core flow path of the engine.

Another exemplary embodiment of this disclosure relates to a seal for a gas turbine engine including a linear portion and a first wall and a second wall. The first and second walls protrude away from the linear portion to provide at least one trough therebetween. Further, each of the first wall and the second wall have a portion with an inflection away from the centerline of the seal.

In a further embodiment of any of the above, the seal is substantially U-shaped.

In a further embodiment of any of the above, the portion with the inflection away from the centerline of the seal is provided distal from the linear portion.

In a further embodiment of any of the above, each of the first wall and the second wall have an inflection toward the centerline of the seal proximate the linear portion.

In a further embodiment of any of the above, each of the first wall and the second wall include at least one pressure balance hole proximate the linear portion.

Another exemplary embodiment of this disclosure relates to a method of assembly. The method includes arranging a mate face of a first component adjacent a mate face of a second component to provide a track. The method further includes pinching first and second walls of a seal toward one another, and inserting the seal into the track.

In a further embodiment of any of the above, the first and second walls are released after the seal is inserted into the track, such that the first and second walls spring outwardly away from one another to maintain the seal in the track.

In a further embodiment of any of the above, the seal includes a linear portion, the first and second walls protruding upwardly from the linear portion.

In a further embodiment of any of the above, the mate face of the first component and the mate face of the second component are each curved to allow insertion of the seal from one direction.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 6 illustrates a seal according to this disclosure including an optional pressure balance hole.

FIGS. 7A-7C illustrate the sealing arrangement according to this disclosure in radial mismatch, arch-binding, and arch-flattening orientations, respectively.

FIG. 8 illustrates another example sealing arrangement according to this disclosure.

These and other features of the present disclosure can be best understood from the following drawings and detailed description.

DETAILED DESCRIPTION

Figure 1:
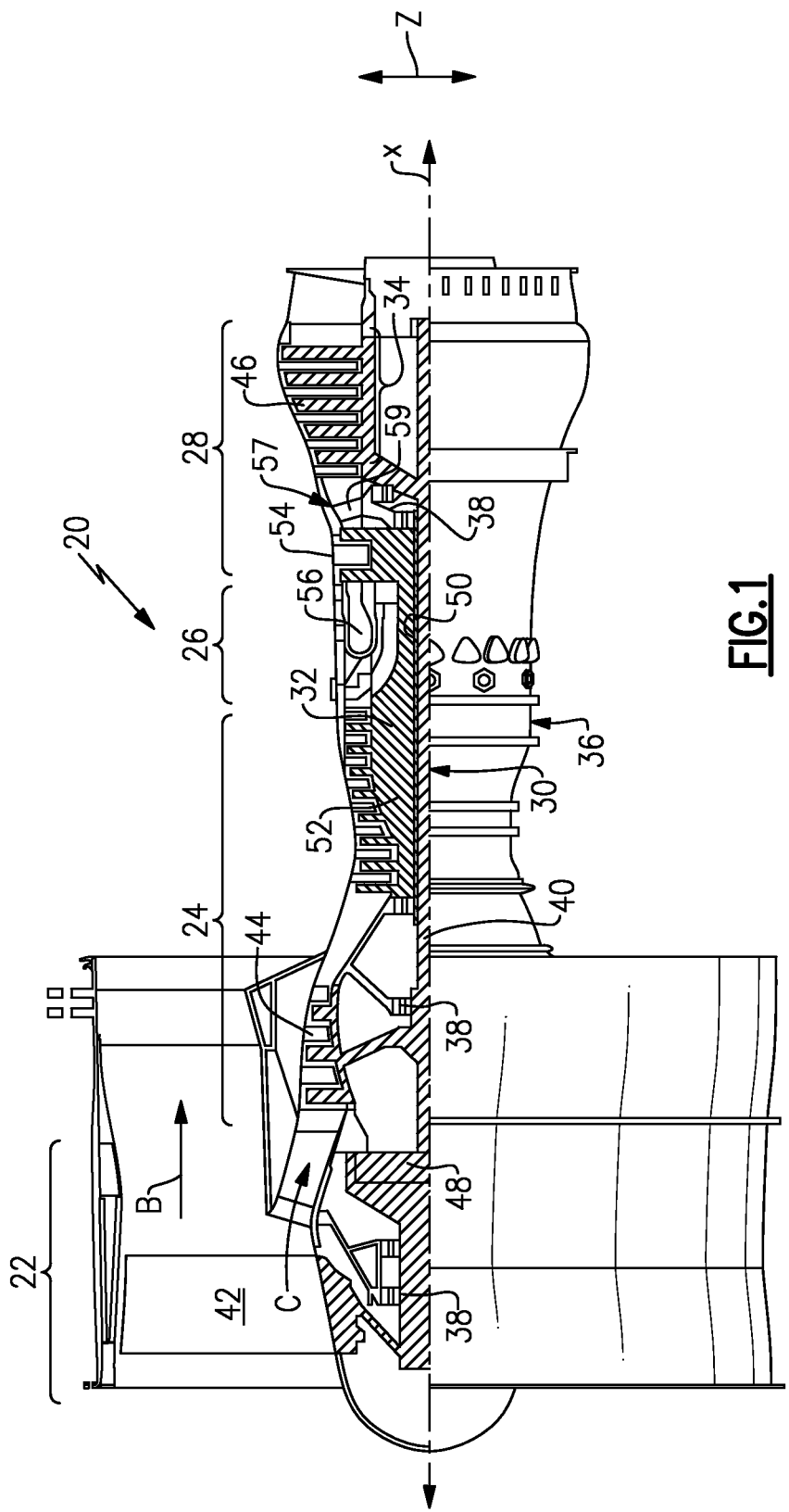
FIG. 1 schematically illustrates a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44, then by the high pressure compressor 52, mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed," as disclosed herein according to one non-limiting embodiment, is less than about 1150 ft/second.

Figure 2:
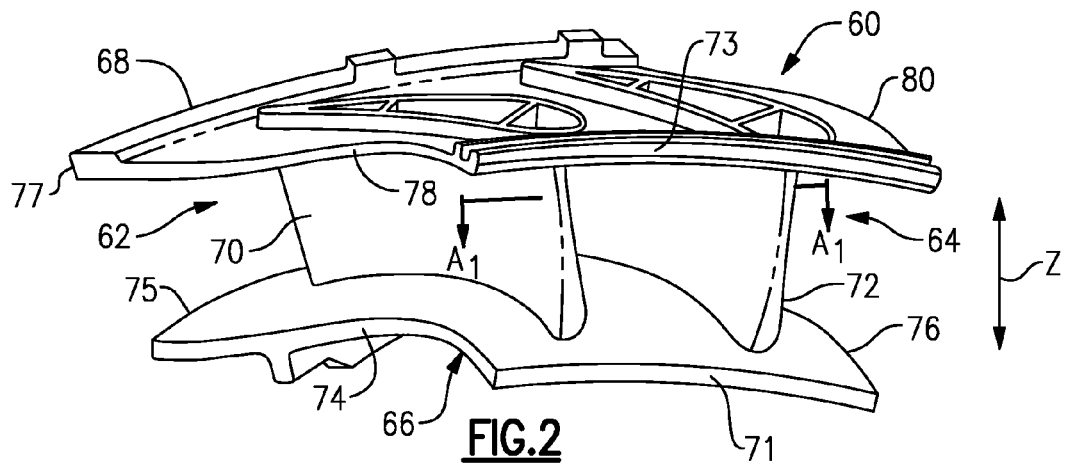
FIG. 2 is a perspective view of an example airfoil assembly.

FIG. 2 illustrates an example airfoil assembly 60 according to this disclosure. In this example, the airfoil assembly 60 is a "doublet," and includes a pair of stator vanes 62, 64. While a "doublet" is illustrated, it should be understood that this disclosure extends outside of "doublets," and in fact may be beneficial in the context of rotor blades, inlet guide vanes (e.g., the vanes 59 of the mid-turbine frame 57), blade outer air seals (BOAS), and other structures. However, the examples may be particularly beneficial when used in the turbine section 28 of the engine 20 where the stator vanes in the turbine section 28 are exposed to relatively high temperatures during engine operation.

The example airfoil assembly 60 includes an inner platform 66, an outer platform 68, and airfoil sections 70, 72 extending therebetween in a radial direction Z, which is generally perpendicular to the engine central longitudinal axis X. Each of the inner platform 66 and the outer platform 68 include a leading edge 71, 73, a trailing edge 75, 77, and plurality of circumferential mate faces. The inner platform 66 includes a first mate face 74 and a second mate face 76 on opposing circumferential sides thereof. Likewise, the outer platform 68 includes first and second mate faces 78, 80.

Figure 3:
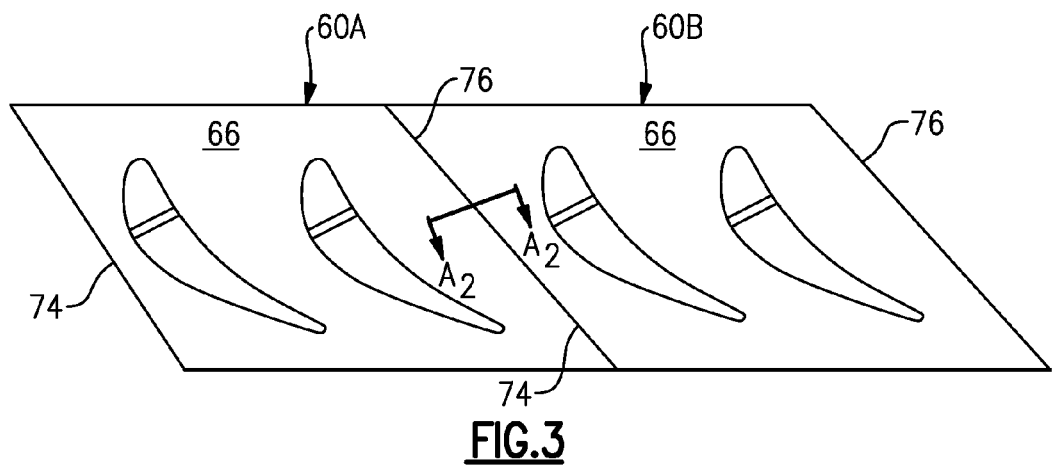
FIG. 3 is a top view of two adjacent airfoil assemblies.

FIG. 3 is representative of the arrangement of two airfoil assemblies (e.g., first and second engine components) 60A, 60B circumferentially arranged relative to one another, viewed along line A1-A1 from FIG. 2. As illustrated in FIG. 3, the mate faces 74, 76 of the inner platforms 66 are provided circumferentially adjacent one another. This arrangement will be further explained below.

Figure 4:
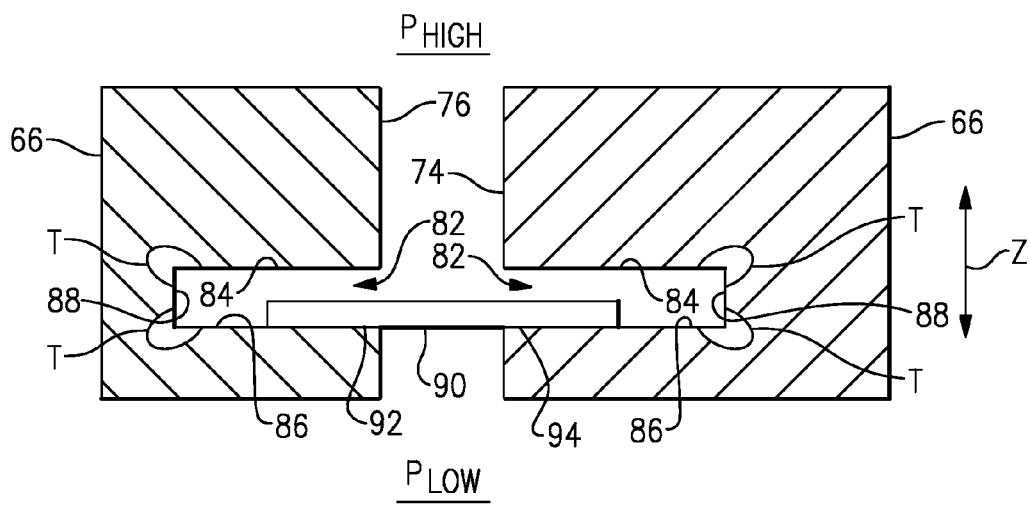
FIG. 4 illustrates a prior art featherseal arrangement.

FIG. 4 illustrates a prior art sealing arrangement, viewed along line A2-A2. In the prior art arrangement, each of the mate faces 74, 76 includes a featherseal slot 82 therein. The featherseal slots 82 in this example are generally rectangular, and include first and second horizontal surfaces 84, 86 and a vertical surface 88. A substantially rectangular featherseal 90 is provided in each of the featherseal slots 82, and extends circumferentially between the adjacent featherseal slots 82 and axially between the leading and trailing edges 71, 75.

During operation of the engine, a relatively high pressure $P_{HIGH}$ is provided on one side of the featherseal 90, while a relatively low pressure $P_{LOW}$ is provided on the opposite side of the pressure seal 90. In one example, the high pressure $P_{HIGH}$ is provided by a pressurized flow of cooling fluid from an upstream plenum. The high pressure $P_{HIGH}$, in the example of FIG. 4, urges the featherseal 90 against the second horizontal surfaces 86 to provide contact points 92, 94. These contact points 92, 94 provide a seal between the high pressure $P_{HIGH}$ and low pressure $P_{LOW}$ sides of the featherseal 90.

The arrangement of FIG. 4 includes relatively sharp corners between the first and second horizontal surfaces 84, 86, and the vertical surfaces 88. These sharp corners can lead to high thermal stress concentrations, illustrated at T. Further, because the featherseal 90 is generally planar, there may be leakage at the contact points 92, 94.

Figure 5:
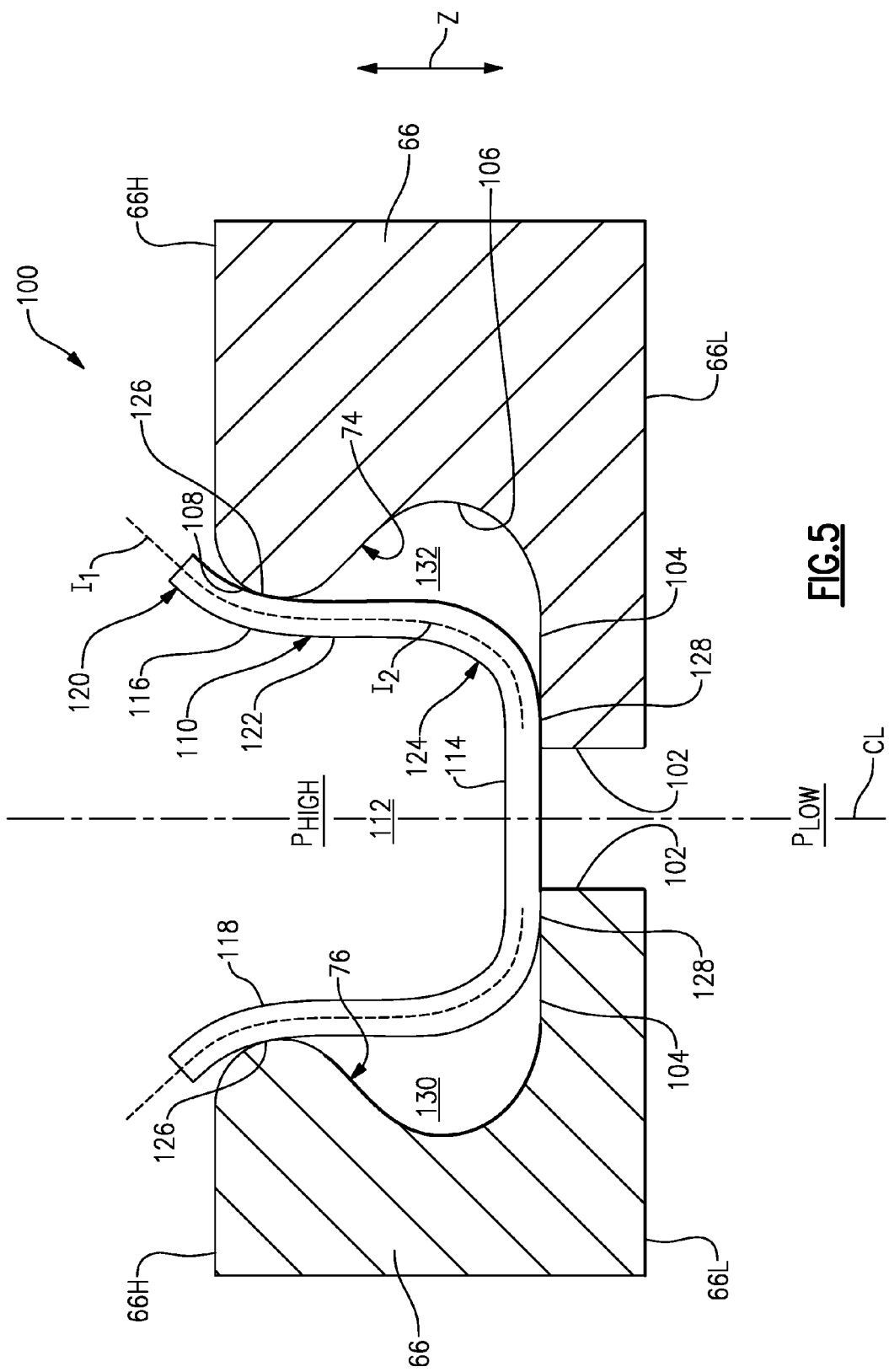
FIG. 5 illustrates an example sealing arrangement according to this disclosure.

FIG. 5 is a cross-sectional view taken along lines A2-A2, and illustrates a sealing arrangement 100 according to this disclosure. As illustrated in FIG. 5, the inner platforms 66 have curved mate faces 74, 76. The mate faces 74, 76 generally extend between a low pressure surface 66L of the inner platform and a high pressure surface 66H of the inner platform 66. For example, one of the surfaces is a radially inner surface and the other surface is a radially outer surface. As will be explained below, the mate faces 74, 76 essentially provide a track for supporting a seal therebetween.

Moving from the low pressure surface 66L, each of the mate faces 74, 76 includes a substantially vertical portion 102 adjacent a substantially horizontal portion 104. The horizontal portions 104 transition into concave portions 106, which in turn transition into convex portions 108 between the concave portion 106 to the high pressure surface 66H. It should be understood that while FIG. 5 illustrates inner platforms 66, that this disclosure can be used relative to outer platforms 68.

The example sealing arrangement 100 includes a seal 110 provided between the first and second mate faces 74, 76. In this example, the seal 110 is a trough seal, including at least one trough 112. In this example, the trough 112 is arranged to open towards a high pressure side $P_{HIGH}$. The high pressure side $P_{HIGH}$ in this example is a side exposed to a pressurized flow of cooling air from an upstream plenum (for example), and the low pressure side $P_{LOW}$ is provided by the core flow path C. This disclosure can be used in contexts—for example, outside the context of stator vanes—where $P_{HIGH}$ is not generated by a flow of pressurized cooling fluid. This disclosure extends to any application where an effective seal between a high pressure and low pressure fluid is required.

In the illustrated example, the seal 110 includes a substantially linear portion 114, which in this example is substantially horizontal relative to a seal centerline CL. The linear portion 114 extends laterally between the substantially horizontal portions 104 of each mate face 74, 76. The seal 110 further includes first and second walls 116, 118 protruding away from the linear portion 114. The trough 112 is provided between the first and second walls 116, 118. In this example, the seal 110 is substantially U-shaped and includes one trough 112. However, it should be understood that this disclosure extends to other seal shapes, such as W-shapes, where additional troughs are provided between the first and second walls 116, 118.

Each of the first and second walls 116, 118 include a first portion 120 distal from the linear portion 114. The first portions 120 radially overlap, in the radial direction Z, at least a portion of the each inner platform 66. The first portions 120 radially overlap the convex portions 108 of each inner platform 66. In this example, the first portions 120 have a first inflection $I_1$ away from the seal centerline CL. The first and second walls 116, 118, then transition, at point 122, to a second portion 124 which is proximal the linear section 114 and has a second inflection $I_2$ toward the seal centerline CL.

The shape of the seal 110 establishes two points of contact with each mate face 74, 76. A first point of contact 126 is established between the first section 120 of the first and second walls 116, 118, and the convex portions 108 of the first and second mate faces 74, 76. A second point of contact 128 is established between the linear portion 114 and the substantially horizontal portions 104 of the first and second mate faces 74, 76. The seal 110 thus provides two points of contact 126, 128 with each mate face 74, 76, and therefore provides enhanced sealing.

As illustrated in FIG. 5, there are pockets 130, 132 between the seal 110 and the concave surfaces 106 of the mate faces 74, 76. Depending on the pressure balances between opposite sides of the seal 110 (e.g., $P_{HIGH}$ and $P_{LOW}$), a suction may be created adjacent the pockets 130, 132. In some examples, it may be desirable to provide a plurality of pressure balance holes 134, 136 to balance the pressure differential adjacent the pockets 130, 132, as illustrated in FIG. 6.

The seal 110 is formed of metal, in one example. Further, given the open track provided by the contours of the mate faces 74, 76 illustrated in FIG. 5, the mate faces 74, 76 can be machined using electron discharge machining (EDM) or another like machining process. In another example, the mate faces 74, 76 are cast or forged with the illustrated contours, and require minimal—if any—additional machining beyond the initial casting or forging.

In one example, the seal 110 is loaded between adjacent mate faces 74, 76, by essentially having the opposed walls 116, 118 pinched toward one another (toward the center line CL) and inserted between the adjacent mate faces 74, 76. The seal 110 has an inherent resiliency that causes the seal to spring outwardly to maintain the seal 110 in position between the mate faces 74, 76. Once the engine 20 begins operation, the pressure differential between $P_{HIGH}$ and $P_{LOW}$ urges the trough 112 into the position illustrated in FIG. 5.

The disclosed arrangement of the seal 110 relative to the adjacent mate faces 74, 76 also provides enhanced sealing in conditions where there is a radial mismatch (FIG. 7A), arch-binding (FIG. 7B), or arch-flattening (FIG. 7C) between the first and second mate faces 74, 76. As illustrated, a radial mismatch is created when the adjacent mate faces 74, 76 are radially misaligned; the arch-binding condition is created when the adjacent mate faces abut one another (as compared to the circumferential space between the mate faces in FIG. 5, in particular between the substantially vertical portions 102); and the arch-flattening condition is provided when the mate faces 74, 76 are inclined away from one another. As one skilled in this art would appreciate, the resiliency of the seal 110 coupled with the contours of the seal 110 and the mate faces 74, 76 discussed above, provide a sealing arrangement configured to maintain two points of contact 126, 128 between the seal 110 and each mate face 74, 76, even in the orientations illustrated in FIGS. 7A-7C.

FIG. 8 illustrates another example sealing arrangement according to this disclosure, and in particular illustrates an example where the seal according to this disclosure is used between non-mate faces. In FIG. 8, a seal 138, similar in most respects to the seal 110, is provided between adjacent sealing faces 140, 142. The sealing faces 140, 142 are non-mate faces (unlike the mate faces 74, 76). In this example, the sealing faces 140, 142 are provided generally perpendicular to one another.

The detail of the seal 138 will not be repeated herein. However, the seal 138 is similar in substantially all respects to the seal 110, with the exception of the seal 138 including two linear portions 144, 146 arranged substantially perpendicular to one another to correspond with the flanges (analogous to the horizontal portions 104 in FIG. 5A) 148, 150 of the sealing faces 140, 142. A curved portion 152 provides a smooth transition between the two linear portions 144, 146.

Like the seal 110, the seal 138 provides a trough 154 and two points of contact 156, 158 between each wall of the seal 138 and each of the sealing faces 140, 142. The example of FIG. 8 illustrates one way in which this disclosure can be used outside the context of mate faces. It should be understood that this disclosure can provide effective sealing between other, adjacent faces, depending on the intended application. For one, this disclosure could be used in the context of three-dimensional end walls and mate faces. In this instance, the seal may need to be cold worked.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
a first engine component and a second engine component, the first engine component having a mate face adjacent a mate face of the second engine component, wherein each mate face includes a linear surface and an arcuate surface, each arcuate surface including a concave surface and a convex surface; and
a seal between the mate face of the first engine component and the mate face of the second engine component, the seal including at least one trough, wherein the seal maintains a first point of contact and a second point of contact with each mate face, wherein each first point of contact is with each linear surface, and wherein each second point of contact is with each convex surface.

2. The engine as recited in claim 1, wherein the seal includes a linear portion, and a first wall and a second wall protruding away from the linear portion to provide the at least one trough.

3. The engine as recited in claim 2, wherein each of the first wall and the second wall provide an overlap portion at an end distal from the linear portion, the overlap portions including a first point of contact between the seal and each of the mate faces.

4. The engine as recited in claim 3, wherein the overlap portions have an inflection away from a centerline of the seal.

5. The engine as recited in claim 4, wherein each of the first wall and the second wall have an inflection toward the centerline of the seal proximate the linear portion.

6. A gas turbine engine, comprising:
a first engine component and a second engine component, the first engine component having a mate face adjacent a mate face of the second engine component; and
a seal between the mate face of the first engine component and the mate face of the second engine component, the seal including at least one trough;
wherein the seal includes a linear portion, and a first wall and a second wall protruding away from the linear portion to provide the at least one trough;
wherein each of the first wall and the second wall provide an overlap portion at an end distal from the linear portion, the overlap portions including a first point of contact between the seal and each of the mate faces;
wherein the overlap portions radially overlap a high pressure surface of the first and second engine components.

7. The engine as recited in claim 6, wherein each mate face includes a substantially convex surface adjacent the high pressure surface, the overlap portions being in contact with the convex surfaces.

8. The engine as recited in claim 1, wherein the first component and the second component bound a working fluid flow path of the engine.

9. A seal for a gas turbine engine, comprising:
a linear portion; and
a first wall and a second wall, the first and second walls protruding away from the linear portion to provide at least one trough therebetween, each of the first wall and the second wall having a portion with an inflection away from the centerline of the seal, wherein the seal is substantially U-shaped.

10. The seal as recited in claim 9, wherein the portion with the inflection away from the centerline of the seal is provided distal from the linear portion.

11. The seal as recited in claim 10, wherein each of the first wall and the second wall have an inflection toward the centerline of the seal proximate the linear portion.

12. The seal as recited in claim 9, wherein each of the first wall and the second wall include at least one pressure balance hole proximate the linear portion.

13. A method of assembly, comprising:
arranging a mate face of a first component adjacent a mate face of a second component to provide a track, wherein the track is open in a radial direction;

pinching first and second walls of a seal toward one another; and inserting the seal into the track in the radial direction.

14. The method as recited in claim 13, including releasing the first and second walls after the seal is inserted into the track, such that the first and second walls spring outwardly away from one another to maintain the seal in the track.

15. The method as recited in claim 13, wherein the seal includes a linear portion, the first and second walls protruding upwardly from the linear portion.

16. The engine as recited in claim 1, wherein:

the seal includes a linear portion, a first wall, and a second wall, each of the linear portion, the first wall, and the second wall have an inner surface facing the trough and an outer surface facing away from the trough, the seal maintains a first point of contact with each mate face between the outer surface of the linear portion and the horizontal surface of each mate face, and the seal maintains a second point of contact with each mate face between outer surfaces of the first and second walls and a respective convex surface of each mate face.

17. The method as recited in claim 13, wherein the first and second walls of the seal are pinched toward one another in a direction substantially perpendicular to the radial direction.

18. The engine as recited in claim 1, wherein:

the linear surfaces are co-planar, and each convex surface is spaced-apart from a respective linear surface by a respective concave surface.

\* \* \* \* \*